United States Patent Office 3,238,017
Patented Mar. 1, 1966

---

3,238,017
METHOD FOR THE RECOVERY OF HYDROGEN FLUORIDE FROM THE SPENT GASES
Taro Yamaguchi, Tokyo, and Makoto Sasakura, Onoda, Japan, assignors to Onoda Cement Company, Limited, Onoda, Japan, a corporation of Japan
No Drawing. Filed Dec. 24, 1962, Ser. No. 246,679
6 Claims. (Cl. 23—153)

This invention relates to a method for the recovery of hydrogen fluoride from such a spent gas containing gaseous hydrogen fluoride or gaseous hydrogen fluoride and silicon fluoride as that produced in the manufacture of calcined phosphate fertilizer, fused phosphate fertilizer or metallic aluminium and etc. by treating with an aqueous recovery solution comprising at least one salt selected from the group consisting of sodium sulfate, sodium chloride, sodium nitrate, potassium sulfate, potassium chloride, potassium nitrate, ammonium sulfate, ammonium chloride and ammonium nitrate.

It was well known that such a spent gas contains gaseous hydrogen fluoride and silicon fluoride.

An object of this invention is to provide an economical method for the production of gaseous, liquid or aqueous hydrogen fluoride having high purity and high concentration from spent gases.

Another object of this invention is to provide an economical method for the preparation of sodium hydrogen fluoride having high purity from spent gases.

Further, another object of this invention is to provide an economical method for the production of sodium fluoride having high purity from spent gases.

Still further, another object of this invention will be obvious from the detailed illustrations described hereinunder.

We found that an aqueous recovery solution comprising, for example, such an alkaline compound as sodium sulfate, potassium sulfate and ammonium sulfate as used in this invention easily reacts with hydrogen fluoride and silicon fluoride contained in the spent gases at a temperature of below 90° C. and forms filterable sodium hydrogen fluoride and silicon fluoride salts.

These chemical reactions are shown by the following equations:

$$Na_2SO_4 + 2HF \rightarrow NaHF_2\downarrow + \tfrac{1}{2}Na_2SO_4 + \tfrac{1}{2}H_2SO_4 \quad (1)$$
$$K_2SO_4 + 2HF \rightarrow KHF_2 + \tfrac{1}{2}K_2SO_4 + \tfrac{1}{2}H_2SO_4 \quad (2)$$
$$(NH_4)_2SO_4 + 2HF \rightarrow NH_4HF_2$$
$$\qquad + \tfrac{1}{2}(NH_4)_2SO_4 + \tfrac{1}{2}H_2SO_4 \quad (3)$$
$$Na_2SO_4 + 2HF + SiF_4 \rightarrow Na_2SiF_6\downarrow + H_2SO_4 \quad (4)$$
$$K_2SO_4 + 2HF + SiF_4 \rightarrow K_2SiF_6\downarrow + H_2SO_4 \quad (5)$$
$$(NH_4)_2SO_4 + 2HF + SiF_4 \rightarrow (NH_4)_2SiF_6 + H_2SO_4 \quad (6)$$

Sodium hydrogen fluoride has low solubility in acidic solution and therefore, it easily precipitates from the aqueous phase as the concentration of sodium sulfate in the aqueous solution increases. (Shown in the chemical Equation 1.)

Potassium hydrogen fluoride and ammonium hydrogen fluoride have high solubility in water and therefore, they do not precipitate from the aqueous phase even if the concentration of potassium sulfate and ammonium sulfate increases. (Shown in the chemical Equations 2 and 3.)

And also sodium silicon fluoride and potassium silicon fluoride have low solubility in acidic solution and hence, they easily precipitate from the aqueous phase as shown in the chemical Equations 4 and 5 but ammonium silicon fluoride does not precipitate from the aqueous phase as it has high solubility in acidic solution. (Shown in the chemical Equation 6.)

We also found the facts that the potassium hydrogen fluoride, ammonium hydrogen fluoride and ammonium silicon fluoride contained in the reaction products as shown in the chemical Equations 2, 3 and 6 can be converted into sodium hydrogen fluoride and sodium silicon fluoride by adding sodium fluoride to said reaction products containing sulfuric acid respectively and the resulting sodium hydrogen fluoride and sodium silicon fluoride precipitate from the aqueous phase.

These chemical reactions are shown by the following equations:

$$NaHF_2 + \tfrac{1}{2}Na_2SO_4 + \tfrac{1}{2}H_2SO_4$$
$$\qquad + 2NaF \rightarrow 2NaHF_2\downarrow + Na_2SO_4 \quad (7)$$
$$KHF_2 + \tfrac{1}{2}K_2SO_4 + \tfrac{1}{2}H_2SO_4$$
$$\qquad + 2NaF \rightarrow 2NaHF_2\downarrow + K_2SO_4 \quad (8)$$
$$NH_4HF_2 + \tfrac{1}{2}(NH_4)_2SO_4 + \tfrac{1}{2}H_2SO_4$$
$$\qquad + 2NaF \rightarrow 2NaHF_2\downarrow + (NH_4)_2SO_4 \quad (9)$$
$$(NH_4)_2SiF_6 + H_2SO_4 + 4NaF$$
$$\qquad \rightarrow Na_2SiF_6\downarrow + 2NaHF_2\downarrow + (NH_4)_2SO_4 \quad (10)$$

In accordance with this invention the resulting sodium hydrogen fluoride and a mixture of sodium hydrogen fluoride and sodium silicon fluoride are separated from the mother liquor by the well known filtrating processes and they decompose into sodium fluoride and hydrogen fluoride gas by heating them at a temperature of from 250 to 300° C. for a short period of time without the decomposition of sodium silicon fluoride.

This decomposition reaction is shown by the following equation:

$$NaHF_2 \rightarrow NaF + HF \quad (11)$$

In accordance with this invention the resulting gaseous hydrogen fluoride can be obtained in the anhydrous state when sodium hydrogen fluoride is dried before it is subjected to heat decomposition or can be obtained aqueous hydrogen fluoride having high purity and high concentration if it is absorbed into water and also the resulting sodium fluoride can be recycled and used for converting potassium hydrogen fluoride, ammonium hydrogen fluoride and ammonium silicon fluoride into sodium salts as shown in the chemical Equations 8, 9, and 10. It is also noted that if such a sodium fluoride is added to the reaction product as shown in the chemical Equation 1 said sodium fluoride itself can be converted into sodium hydrogen fluoride in accordance with the reaction as shown in the chemical Equation 7.

And also, in accordance with this invention the concentration of hydrogen ion of the mother liquors produced by the chemical reactions as shown in the chemical Equations 7, 8, 9 and 10 can be controlled by adding such an alkaline substance as sodium hydroxide, potassium hydroxide or ammonium hydroxide, and then the mother liquors can be used and recycled for absorbing the gaseous hydrogen fluoride and silicon fluoride contained in the spent gases.

When the precipitate of the sodium silicon fluoride or potassium silicon fluoride as shown in the chemical Equation 4, 5 or 10 accumulates to a large amount in the reaction medium by a long running of the method in accordance with this invention, said precipitate is removed from said reaction medium and sodium silicon fluoride is converted into sodium fluoride and silicon oxide by adding such an alkaline substance as sodium hydroxide and sodium carbonate thereto. Such an alkaline substance may be used in the state of an aqueous solution having the concentration of from 3 to 30 percent.

This chemical reaction is shown by the following equation:

$$Na_2Si_6 + \chi NaOH \rightarrow 6NaF\downarrow + SiO_2$$
$$\qquad + (\chi - 4)NaOH + 2H_2O \quad (12)$$

The resulting sodium fluoride can also be recycled and used for the production of sodium hydrogen fluoride.

The contaminaton of sodium hydrogen fluoride by sodium silicon fluoride is prevented by carrying out the chemical Reactions 2 and 8 after the precipitation of potassium silicon fluoride was removed from the mother liquor or by carrying out the chemical Reaction 3 and 9 after ammonium silicon fluoride was converted into the precipitate of potassium silicon fluoride by adding potassium hydroxide or potassium carbonate to the aqueous solution comprising ammonium silicon fluoride and sulfuric acid as shown in the chemical Equation 6 and potassium silicon fluoride thus produced was removed from the mother liquor.

This chemical reaction is shown by the following equation:

$$(NH_4)_2SiF_6 + H_2SO_4 + K_2CO_3 \rightarrow K_2SiF_6\downarrow \\ + (NH_4)_2SO_4 + CO_2 + H_2O \quad (13)$$

Although this invention has been illustrated above by utilizing an aqueous recovery solution comprising only one salt selected from the group consisting of sodium sulfate, sodium chloride, sodium nitrate, potassium sulfate, potassium chloride, potassium nitrate, ammonium sulfate, ammonium chloride and ammonium nitrate, it will be understood that other aqueous recovery solutions comprising two or more salts selected from said group may be used.

The concentration of hydrogen ion of both the aqueous recovery solutions and the recycled aqueous recovery solutions used in accordance with this invention is controlled to the neutral or acidic state, preferably to the state containing free acids in an amount of from zero to 5 percent by weight and the temperature of said aqueous solutions in use is controlled to within the range of from 10 to 90° C., preferably from 40 to 80° C. In such conditions, sodium hydrogen fluoride precipitates as a fine crystal.

The concentration of the chemicals in the aqueous recovery solutions used in this invention must be controlled so as not to permit the aforesaid chemicals, potassium hydrogen fluoride and ammonium hydrogen fluoride in the mother liquor to precipitate.

The aqueous recovery solutions contain, for example, 6 to 30 grams of sodium sulfate per 100 grams of water or 6 to 10 grams of potassium sulfate per 100 grams of water or 6 to 40 grams of ammonium sulfate per 100 grams of water.

As illustrated above, not only the gaseous hydrogen fluoride contained in the spent gases can be easily and economically recovered as the sodium hydrogen fluoride in accordance with this invention but since the potassium hydrogen fluoride and ammonium hydrogen fluoride have high solubility in water, they do not adhere to the inner surface of such an apparatus as pipes or the container used.

The following is an illustration of this invention by way of actual examples:

*Example 1*

An aqueous recovery solution for gaseous hydrogen fluoride contained in the spent gas was prepared by dissolving 172 grams of anhydrous sodium sulfate into 1000 grams of water.

It was found that 40 grams of hydrogen fluoride contained in the spent gas had been completely absorbed by spraying the aqueous recovery solution in the spent gas having the concentration of about 3.0 percent gaseous hydrogen fluoride by volume, and that the resulting solution had the composition constituting of 1000 grams of water, 62 grams of sodium hydrogen fluoride, 101 grams of sodium sulfate and 49 grams of sulfuric acid. 23 grams of sodium hydrogen fluoride had precipitated from the mother liquor when 42 grams of sodium fluoride were added to the resulting solution while said solution was maintained at the constant temperature of 80° C. with agitation. In such case, the mother liquor had the composition constituting of 1000 grams of water, 70 grams of sodium hydrogen fluoride, 136.5 grams of sodium sulfate and 24.5 grams of sulfuric acid.

Further experiments were carried out over five times by bubbing the spent gas having the concentration of about 3.0 percent gaseous hydrogen fluoride into the mother liquor mentioned above, and said mother liquor absorbed 20 grams of hydrogen fluoride contained in the spent gas, and then 42 grams of sodium fluoride were added thereto at the constant temperature of 80° C. while the spent gas bubbling out from the mother liquor was absorbed into the water solution of sodium carbonate. It was determined from the experiments that the precipitate was sodium hydrogen fluoride and the gaseous hydrogen fluoride contained in the spent gas was completely recovered.

The experimental results are shown in Table 1.

TABLE 1

| Number of Experiment | NaF used in grams | HF used in grams | Recovery Ratio | NaHF$_2$ in grams (Theoretical) | NaHF$_2$ in grams (Observed) |
|---|---|---|---|---|---|
| 1 | 42 | 20 | 100 | 62 | 54 |
| 2 | 42 | 20 | 99.7 | 62 | 62 |
| 3 | 42 | 20 | 99.9 | 62 | 60 |
| 4 | 42 | 20 | 99.8 | 62 | 61 |
| 5 | 42 | 20 | 99.6 | 62 | 60.7 |
| Total | 210 | 100 | | 310 | 297.7 |

The sodium hydrogen fluoride thus obtained was converted into sodium fluoride and hydrogen fluoride corresponding to 48–50% of fluoride contained in sodium hydrogen fluoride when it was heated at the temperature of 300° C. for 30 minutes. The recovery ratio of hydrogen fluoride contained in the spent gas decreased to 96.3 percent when the experiments shown in Table 1 were carried out at the temperature of 90° C.

*Example 2*

An aqueous recovery solution for gaseous hydrogen fluoride and silicon fluoride contained in the spent gas was prepared by dissolving 200 grams of anhydrous potassium sulfate into 1000 grams of water containing 10 grams of sulfuric acid.

It was found that the gaseous hydrogen fluoride and silicon fluoride contained in the spent gas had been completely absorbed and converted into potassium hydrogen fluoride and potassium silicon fluoride respectively by spraying the aqueous recovery solution in the spent gas comprising 1.1 percent hydrogen fluoride, 0.05 percent silicon fluoride by volume and the balance of air at the constant temperature of 80° C., and that 19.0 grams of potassium silicon fluoride had precipitated from the mother liquor. In this case it was also found that the mother liquor had the composition constituting of 800 grams of water, 78 grams of potassium hydrogen fluoride, 95.6 grams of potassium sulfate, 68.8 grams of sulfuric acid and 3 grams of potassium silicon fluoride.

87.0 grams of sodium hydrogen fluoride had precipitated from the liquid phase by adding 84.0 grams of sodium fluoride to the mother liquor mentioned above.

The filtrate obtained by filtrating the precipitate of said sodium hydrogen fluoride had the composition constituting of 800 grams of water, 37 grams of sodium hydrogen fluoride, 182.6 grams of potassium sulfate, 19.8 grams of sulfuric acid and 3 grams of potassium silicon fluoride.

The sodium hydrogen fluoride thus produced had the purity of above 99 percent. Said sodium hydrogen fluoride was decomposed into gaseous hydrogen fluoride by heating at the temperature of about 300° C. The resulting gaseous hydrogen fluoride was subjected to cooling, and thereby 26 grams of liquid hydrogen fluoride having the purity of above 99.9 percent, and containing 0.03 percent hydrogen silicon fluoride and below 0.01 percent SO₃ by weight were obtained.

This filtrate was changed, in composition, to an aqueous solution comprising 800 grams of water, 37 grams of sodium hydrogen fluoride, 200 grams of potassium sulfate, 10 grams of sulfuric acid and 3 grams of potassium silicon fluoride by adding 13.8 grams of potassium carbonate thereto.

The resulting aqueous solution was used as the recycle solution for treating the spent gas.

*Example 3*

4480 liters of the gas mixture comprising gaseous hydrogen fluoride, silicon fluoride and the balance of air were bubbled into the aqueous recovery solution constituting of 850 grams of water, 150 grams of ammonium sulfate and 40 grams of sodium hydrogen fluoride, and 52 grams of hydrogen fluoride and 10.4 grams of silicon fluoride were absorbed into said solution. It was observed that 14.3 grams of sodium silicon fluoride had precipitated from the mother liquor.

The filtrate obtained by filtrating the precipitate of sodium silicon fluoride had the composition constituting of 850 grams of water, 27.6 grams of sodium hydrogen fluoride, 68.4 grams of ammonium hydrogen fluoride, 70.8 grams of ammonium sulfate, 5.4 grams of sodium silicon fluoride and 58.8 grams of sulfuric acid.

This filtrate was changed, in composition, to an aqueous solution comprising 850 grams of water, 40 grams of sodium hydrogen fluoride, 57 grams of ammonium hydrogen fluoride, 84 grams of ammonium sulfate, 4.5 grams of sodium silicon fluoride and 49 grams of sulfuric acid by adding 10.6 grams of sodium carbonate thereto.

124.0 grams of sodium hydrogen fluoride had precipitated from the liquid phase by adding 84.0 grams of sodium fluoride to the resulting aqueous solution mentioned above.

The filtrate obtained by filtrating the precipitate of said sodium hydrogen fluoride had the composition constituting of 850 grams of water, 40.0 grams of sodium hydrogen fluoride, 150 grams of ammonium sulfate and 4.5 grams of sodium silicon fluoride. This filtrate was recycled into the treating step of the spent gas as a recovery solution.

*Example 4*

An aqueous recovery solution was prepared by dissolving 150 grams of ammonium sulfate into 850 grams of water.

The spent gas comprising 1.1 percent gaseous hydrogen fluoride, 0.05 percent silicon fluoride by volume and the balance of air was bubbled into the aqueous recovery solution at the constant temperature of 80° C. The resulting solution had the composition constituting of 850 grams of water, 57.0 grams of ammonium hydrogen fluoride, 70.8 grams of ammonium sulfate, 17.8 grams of ammonium silicon fluoride and 58.8 grams of sulfuric acid. It was observed that 19.0 grams of potassium silicon fluoride had precipitated from the mother liquor by adding 13.8 grams of potassium carbonate thereto.

The filtrate obtained by filtrating the precipitate of potassium silicon fluoride had the composition constituting of 850 grams of water, 57.0 grams of ammonium hydrogen fluoride, 84.0 grams of ammonium sulfate, 3.0 grams of potassium silicon fluoride and 49.0 grams of sulfuric acid.

84.0 grams of sodium hydrogen fluoride had precipitated from the liquid phase by adding 84.0 grams of sodium fluoride to the filtrate mentioned above.

The precipitate of said sodium hydrogen fluoride was recovered by filtering the same.

The resulting filtrate had the composition constituting of 850 grams of water, 40.0 grams of sodium hydrogen fluoride and 150 grams of ammonium sulfate and recycled into the treating step of the spent gas as a recovery solution.

*Example 5*

An aqueous recovery solution was prepared by dissolving 130 grams of ammonium sulfate, 30 grams of potassium sulfate into 840 grams of water containing 10 grams of sulfuric acid.

4480 liters of the gas mixture comprising gaseous hydrogen fluoride, silicon fluoride and the balance of air were bubbled into the aqueous recovery solution and 52 grams of hydrogen fluoride and 10.4 grams of silicon fluoride were converted into ammonium hydrogen fluoride, potassium hydrogen fluoride and potassium silicon fluoride.

The precipitate of potassium silicon fluoride was filtered from the mother liquor, and 19.0 grams of potassium silicon fluoride were obtained therefrom.

85.0 grams of sodium hydrogen fluoride had precipitated from the liquid phase when 84.0 grams of sodium fluoride were added to the mother liquor mentioned above.

The filtrate obtained by filtrating the precipitate of said sodium hydrogen fluoride had the composition constituting of 840 grams of water, 37 grams of sodium hydrogen fluoride, 12.0 grams of potassium sulfate, 130 grams of ammonium sulfate, 3 grams of potassium silicon fluoride and 19.8 grams of sulfuric acid.

This filtrate was changed, in composition, to an aqueous solution comprising 840 grams of water, 37 grams of sodium hydrogen fluoride, 30 grams of potassium sulfate, 130 grams of ammonium sulfate, 3 grams of potassium silicon fluoride and 10 grams of sulfuric acid by adding 13.8 grams of potassium carbonate thereto.

The resulting aqueous solution was used as the recycle solution for treating the spent gas.

What we claim is:

1. A method for the recovery of hydrogen fluoride and silicon fluoride from spent gases containing hydrogen fluoride and silicon fluoride, said method comprising the steps of treating said spent gases with an aqueous recovery solution comprising at least one salt selected from the group consisting of potassium sulfate, potassium chloride, potassium nitrate, ammonium sulfate, ammonium chloride and ammonium nitrate, said recovery solution having a concentration of from zero to 5 percent free acid by weight of said recovery solution and being at a temperature of from 10 to 90° C., thereby to produce a reaction mixture containing at least one compound selected from the group consisting of potassium hydrogen fluoride and ammonium hydrogen fluoride, and at least one compound selected from the group consisting of potassium silicon fluoride and ammonium silicon fluoride; removing any precipitated potassium silicon fluoride from the reaction mixture; adding sodium fluoride to said reaction mixture to produce a precipitate of sodium hydrogen fluoride in a mother liquor; recovering said sodium hydrogen fluoride by separating it from the mother liquor; heating said sodium hydrogen fluoride to decompose it into sodium fluoride and gaseous hydrogen fluoride, the latter being recovered; recycling the sodium fluoride resulting from said decomposition into said reaction mixture to produce a precipitate of sodium hydrogen fluoride; and recycling said mother liquor as an aqueous recovery solution usable for treating said spent gases after said mother liquor is controlled to have a concentration of from zero to 5 percent free acid by weight of said mother liquor and a temperature of from 10 to 90° C.

2. A method for the recovery of hydrogen fluoride from spent gases containing gaseous hydrogen fluoride and silicon fluoride, said method comprising the steps of treating said spent gases with an aqueous recovery solution comprising at least one potassium salt selected from the group consisting of potassium sulfate, potassium chloride and potassium nitrate, said recovery solution having a concentration of from zero to 5 percent free acid by weight of said recovery solution and being at a temperature of from 10 to 90° C., thereby to produce a reaction mixture containing potassium hydrogen fluoride and a precipitate of potassium silicon fluoride; removing said precipitate of potassium silicon fluoride from the reaction mixture; adding sodium fluoride to said reaction mixture to produce a precipitate of sodium hydrogen fluoride in a mother liquor; recovering said sodium hydrogen fluoride by separating it from the mother liquor; heating said sodium hydrogen fluoride; recycling the sodium fluoride resulting from said decomposition into said reaction mixture for producing a precipitate of sodium hydrogen fluoride to decompose it into sodium fluoride and gaseous hydrogen fluoride, the latter being recovered; and recycling said mother liquor as an aqueous recovery solution usable for treating said spent gases after said mother liquor is controlled to have a concentration of from zero to 5 percent free acid by weight of said mother liquor and a temperature of from 10 to 90° C.

3. A method for the recovery of hydrogen fluoride from spent gases containing gaseous hydrogen fluoride and silicon fluoride, said method comprising the steps of treating said spent gases with an aqueous recovery solution comprising at least one ammonium salt selected from the group consisting of ammonium sulfate, ammonium chloride and ammonium nitrate, said recovery solution having a concentration of from zero to 5 percent free acid by weight of said recovery solution and being at a temperature of from 10 to 90° C., thereby to produce a reaction mixture containing ammonium hydrogen fluoride and ammonium silicon fluoride; adding an alkaline potassium compound to the reaction mixture to produce a precipitate of potassium silicon fluoride; removing said precipitate of potassium silicon fluoride from said reaction mixture; adding sodium fluoride to said reaction mixture to produce a precipitate of sodium hydrogen fluoride in a mother liquor; recovering said sodium hydrogen fluoride by separating it from the mother liquor; heating said sodium hydrogen fluoride to decompose it into sodium fluoride and gaseous hydrogen fluoride, the latter being recovered; recycling the sodium fluoride resulting from said decomposition into said reaction mixture to produce a precipitate of sodium hydrogen fluoride; and recycling said mother liquor as an aqueous recovery solution usable for treating said spent gases after said mother liquor is controlled to have a concentration of from zero to 5 percent free acid by weight of said mother liquor and a temperature of from 10 to 90° C.

4. A method for the recovery of hydrogen fluoride from spent gases according to claim 1, wherein the aqueous recovery solution is an aqueous solution containing 6 to 10 grams of ammonium salt per 100 grams of water.

5. A method for the recovery of hydrogen fluoride from spent gases according to claim 2, wherein the aqueous recovery solution is an aqueous solution containing 6 to 10 grams of potassium salt per 100 grams of water.

6. A method for the recovery of hydrogen fluoride from spent gases according to claim 3, wherein the aqueous recovery solution is an aqueous solution containing 6 to 10 grams of ammonium salt per 100 grams of water.

References Cited by the Examiner

UNITED STATES PATENTS

| | | | |
|---|---|---|---|
| 1,235,552 | 8/1917 | Chappell | 23—88 |
| 2,156,273 | 5/1939 | Bozarth | 23—88 |
| 2,231,309 | 2/1941 | Weber | 23—88 |
| 3,087,787 | 4/1963 | Flemmert | 23—88 X |

BENJAMIN HENKIN, *Primary Examiner.*

MAURICE A. BRINDISI, *Examiner.*

E. STERN, *Assistant Examiner.*